United States Patent [19]

Harlan, Jr.

[11] 3,904,801

[45] Sept. 9, 1975

[54] HYDROXYLATED AND CHLORINATED BLOCK COPOLYMER LAMINATES

[75] Inventor: James T. Harlan, Jr., Torrance, Calif.

[73] Assignee: Shell Oil Company, Houston, Tex.

[22] Filed: Nov. 19, 1973

[21] Appl. No.: 417,348

[52] U.S. Cl.............. 428/246; 36/30; 36/32 R; 260/876 B; 260/880 B; 428/424; 428/425; 428/473; 428/519
[51] Int. Cl.² ......................................... B32B 27/08
[58] Field of Search ............ 161/88, 226, 247, 253, 161/254; 260/876 B, 880 B, 879, 859; 36/32, 25 R, 9, 30; 428/288

[56] References Cited
UNITED STATES PATENTS

| | | | |
|---|---|---|---|
| 3,576,912 | 4/1971 | Winkler | 260/880 B |
| 3,589,036 | 6/1971 | Hendricks et al. | 36/32 |
| 3,686,366 | 8/1972 | Winkler | 260/880 B |

*Primary Examiner*—George F. Lesmes
*Assistant Examiner*—R. J. Roche

[57] ABSTRACT

Novel compositions are provided comprising chlorohydrinated block copolymers. Solutions of the chlorohydrinated block polymers have utility as primers and in modifying conventional polyurethane and neoprene adhesives to improve the adhesion between block copolymer products such as soling and various other substrates.

4 Claims, No Drawings

HYDROXYLATED AND CHLORINATED BLOCK COPOLYMER LAMINATES

BACKGROUND OF THE INVENTION

The synthesis and utility of a wide range of block copolymers have advanced rapidly in the past few years. The type contemplated herein may be generally described as those copolymers having at least two polymer blocks of monoalkenyl arenes and at least one polymer block of a conjugated diene as well as hydrogenated counterparts of these products as more fully described hereinafter.

Due to the hydrocarbon structure of all parts of these block copolymers, their utility either alone or compounded has been limited in certain applications, primarily because of deficient adhesiveness toward other surfaces such as metals, wood, leather, polyvinylchloride and the like such as other polymers including polyurethanes, polychloroprene or adhesive compositions. These deficiencies become apparent for example in the construction of shoes and in the manufacture of multiply films. In shoe manufacture the soling material may be either molded, sewn or adhered to the upper, the upper being made of fabric, leather or polyvinylchloride, for example. One of the drawbacks of unmodified block polymer compositions in such constructions has been unsatisfactory adherence of soles made from the block polymer to these uppers especially under wet conditions when using normal commercial shoe assembly adhesives.

In the shoe industry, two generally accepted types of adhesives are employed, namely, neoprene and polyurethane types. By neoprene is meant the general class of polychloroprenes, while by polyurethanes is meant the condensation products of diisocyanates and polyesters or polyethers. In the past, it has been noted that even with the aid of these adhesives between the sole and the uppers, a lack of satisfactory adhesion may occur when one component of the assembly is an unmodified block copolymer composition.

OBJECTS OF THE INVENTION

It is an object of the present invention to provide novel derivatives of block copolymers. It is a further object of the invention to provide improved compositions comprising block copolymers, neoprenes, or polyurethanes. It is a particular object of the invention to provide assemblies comprising as one essential component of an unmodified block copolymer as referred to hereinbefore, adhesively bonded to a polymer component such as a textile, polyvinylchloride or leather. A further object is the provision of an improved process for the preparation of chlorohydrinated block copolymers. Another object is to provide improved adhesives for bonding purposes generally. Other objects will become apparent during the following description of the invention.

STATEMENT OF THE INVENTION

Now, in accordance with the present invention, a novel composition is provided comprising a chlorinated and hydroxylated block copolymer, said copolymer comprising at least two polymer blocks of a monoalkenyl arene and at least one chlorohydrinated polymer block of the group consisting of polymerized conjugated dienes and hydrogenated derivatives of said blocks, the chlorine content of the block copolymer being between 1 and 15% by weight and the weight ratio of chlorine atoms to hydroxyl groups being between 0.5 and 5.0, the chlorine and hydroxyl groups being directly attached to the carbon atoms of the polymer chain. Still in accordance with this invention, it has been found that such chlorohydrinated block copolymers substantially improve the adhesion characteristics of a polymer of the group consisting of unmodified block copolymers or their compounds and cellulosic textiles, leather or polyvinylchloride as well as neoprenes, polyurethanes, metal, wood, glass and the like.

Again, in accordance with this invention, a process for the preparation of uniform products comprises the reaction of an alkaline earth metal hypochlorite in aqueous solution with a hydrocarbon solution of the block polymer which has been modified with a polymer solvent which is soluble in water.

The unmodified block copolymers are typified by but not restricted to those having the structure A—B—A, wherein each A is a polymer block of a monoalkenyl arene such as styrene or $\alpha$-methylstyrene while B is a polymer block of a conjugated diene such as butadiene or isoprene, as well as certain hydrogenated derivatives of the conjugated diene blocks. This basic structure may be modified in the course of block polymer synthesis to provide branched structures or multiblock structures which are linear or branched. For the purpose of the present invention, the precise backbone configuration may be varied among these types. The block molecular weights of the individual blocks expressed as number average molecular weights determined by infrared or tritium counting methods may lie within relatively wide limits. The alkenyl arene polymer blocks normally have average molecular weights between about 4,000 and 50,000, preferably between 14,000 and 25,000, while the conjugated diene polymer blocks or their hydrogenated counterparts have average molecular weights between about 30,000 and 200,000 preferably between about 40,000 and 125,000. Two typical species of the block copolymer structures are as follows:

polystyrene-polybutadiene-polystyrene and polystyrene-polyisoprene-polystyrene.

In addition to these non-hydrogenated species, certain hydrogenated derivatives may be employed where further derivatizing is not contemplated. These comprise polymers in which at least the conjugated diene polymer blocks or any desired fraction thereof are completely or partially hydrogenated. Selective hydrogenation may be carried out to reduce the olefinic double bonds, this process being described in U.S. Pat. NO. 3,595,942.

For the starting material to be used in chlorohydrination, the same type of block copolymers may be employed. However, if hydrogenated species are utilized for this latter purpose, the hydrogenation should be restricted so as to leave a sufficient number of olefinic double bonds in the polymeric molecule for later availability during chlorohydrination.

In the present specification where reference is made to the term "chlorohydrination", this will be meant to include not only the insertion of equal numbers of chlorine and hydroxyl radicals, but also to reactions of chlorohydrination in which the weight ratios of chlorine to hydroxyl may vary between 0.5 and 5.0. The use of a more active chlorohydrinating agent, namely, sodium hypochlorite, is undesirable and in fact usually inoperative due to its high rate of reaction with olefinic double bonds. When aqueous solutions of sodium hypochlorite are contacted with a hydrocarbon solution of the block copolymer, the reaction is so rapid and violent that cross-linking or decomposition of the polymer occurs and the resulting product has been found to be insoluble and virtually useless. Hence, according to one aspect of the present invention, a controllable rection has been devised wherein an aqueous solution of a sparingly water soluble alkaline earth metal hypochlorite is contacted with a hydrocarbon solution of the block copolymer under mold conditions so that the rate of reaction and temperature of the reaction mixture are readily controllable and uniform chlorohydrination results. Moreover, in order to gain suitable reaction, the hydrocarbon solution of the polymer may be modified with a polar water-soluble solvent which is miscible with the hydrocarbon solution at least in the proportions employed. Lower ketones such as acetone, methylethyl ketone or diethyl ketones and $C_{1-3}$ aliphatic monohydric alcohols are examples of suitable water miscible auxiliary solvents. Buffering the acidity of the reaction mixture, e.g. by bubbling in an excess of $CO_2$ may be employed.

The concentration of the block polymer in the hydrocarbon solvent is not critical but should be low enough that stirring or other means of agitation of the reaction mixture does not become a serious problem. The hydrocarbon solvents employed should be those which are not readily attached by the hypochlorite under the conditions of the reaction. Suitable solvents include toluene, cyclohexane and aliphatic hydrocarbons which are preferably saturated such as pentanes or hexanes as well as various mixtures of these hydrocarbons. The reaction is preferably conducted at a temperature between about 35° and 85°F for 5–60 minutes.

The aqueous solution is saturated with an alkaline earth metal hypochlorite, the calcium species being preferred. An additional amount of the hypochlorite is present as a slurry to supply enough of the reactant to reach the degree of reaction desired. Reaction rate is controlled by the rate at which the hypochlorite dissolves. Buffering the reaction, for example, with an excess of carbon dioxide gas may be desirable.

Subsequent to completion of the reaction to a predetermined extent, the aqueous phase is removed and the hydrocarbon solution of the chlorohydrinated polymer purified, if desired, by water washing and if further desired by fractional distillation to remove any part or component of the solvent such as the modifying water miscible solvent, e.g. acetone. The water soluble component normally will comprise 10–50% by weight of the polymer solution during the chlorohydrination reaction.

It has been found that if the chlorohydrinated product is isolated from its hydrocarbon solution, it is virtually insoluble and cannot be readily redissolved in solvents or dispersed in media such as polyurethane or neoprene cements. Consequently, it is preferred to utilize it in the hydrocarbon medium in which it was formed.

While the utility of these chlorohydrinated block copolymers will be described with particular reference to shoe manufacture, it will be understood that they are just as useful for other purposes such as in the bonding of layers of multi-ply films or sheets as well as in other adhesives and bonding or sealing requirements such as polymer to metal, metal to wood etc.

In the construction of shoes for example, it is possible to surface treat a preformed sole or unitsole by wiping with acidified sodium hypochlorite solution or with some other chlorinating agent such as aqueous chlorine. However, this is considered by shoe manufacturers to be objectionable since it would require extensive fume hood installation to eliminate obnoxious odors from the work room. Furthermore, treatment of this type entails an extra manufacturing step adding to the cost of the assembly. The present invention obviates the use of obnoxious chlorinating solutions in the factory.

The chlorohydrinated block copolymers may be applied in shoe manufacture in a number of different alternative situations or in any desired combination thereof. For example, the soling material may be modified with the chlorohydrinated polymer which is then found to adhere substantially better to the neoprene or polyurethane cements applied thereto for the purpose of attaching the textile or other upper. Alternatively, the chlorohydrinated polymers may be added to the polyurethane or neoprene cements. Furthermore, dilute solutions of the chlorohydrinated polymers may be utilized in a priming of either the surface of the sole or of the upper prior to application of the neoprene or polyurethane cements. This latter also entails an extra manufacturing step. If employed as an additive to the soling composition or to the polyurethane or neoprene cements, the chlorohydrinated polymers should be present in an amount of between about 4 and 25 wt.% based on the polymer being modified, said polymer being either a block polymer, a polychloroprene or a polyurethane.

The polyurethanes are reaction products of diisocyanates with polyesters. Suitable diisocyanates are the following:
 diphenylmethane-4,4'-diisocyanate,
 diphenylene-4,4'-diisocyanate,
 2,4-toluylene diisocyanate,
 2,6-toluylene diisocyanate,
 3,3-dimethoxy-4,4'-diphenylene diisocyanate (dianisidine diisocyanate),
 tetramethylene diisocyanate,
 hexamethylene diisocyanate,
 decamethylene diisocyanate,
 ethylene diisocyanate,
 ethylidene diisocyanate,
 propylene-1,2-diisocyanate,
 cyclohexylene-1,2-diisocyanate,
 m-phenylene diisocyanate,
 p-phenylene diisocyanate,
 1,5-napthalene diisocyanate,
 3-3'-dimethyl-4,4'-biphenylene diisocyanate,
 3,3'-dimethoxy-4,4'-biphenylene diisocyanate,
 3,3'-diphenyl-4,4'-biphenylene diisocyanate,
 4,4'-biphenylene diisocyanate,
 3,3'-dichloro-4,4'-biphenylene diisocyanate, furfurylidene diisocyanate,
 bis-(2-isocyanatoethyl)fumarate.

Suitable esters include polyethylene glycols and the like. Both the polyurethanes, the neoprenes and the non-derivatized block copolymers may be modified with other components for their particular utility. For example, the block copolymers when intended for use as soling materials in footwear may be modified with suitable amounts of other compatible polymers such as polystyrene, polyepoxide, polypropylene or with fillers or extenders such as titanium dioxide or calcium carbonate and with extending oils. Typical shoe sole components of this type are described in U.S. Pat. No. 3,589,036. The polychloroprene or polyurethane may be modified with extenders or with tackifying resins. Commercial adhesives utilized widely in the shoe industry are the following: Compo 5134, sold by Compo Industries, Inc. Suitable neoprenes (chloroprenes) include types W or G. Suitable polyurethane cements used in the shoe industry include USM 312 or USM 322, both sold by the United Shoe Machinery Company as well as Compo 4500 and Compo 9500, both sold by Compo Industries Incorporated.

The following examples illustrate the use of the present invention:

EXAMPLE I

Preparation of Chlorohydrinated Block Copolymer

The block copolymers employed had the structure polystyrene-polybutadiene-polystyrene with average block molecular weights as follows:

Polymer I : 14,000 - 64,000 - 14,000
Polymer II: 22,500 - 50,000 - 22,500.

Each block copolymer was dissolved in toluene containing acetone in a volume ratio of 9 or 6 toluene : 3.5 acetone, and an aqueous suspension of calcium hypochlorite was added slowly enough to prevent excessive temperature rise due to the exotherm reaction. Total amounts added are shown in the following table. The temperature of the reaction was controlled between 16° and 18°C by external cooling and the reaction mixture was maintained approximately neutral (pH = 7) by bubbling carbon dioxide gas continuously through it. The following table also lists chlorine and hydroxyl (expressed as oxygen) contents for four primer samples.

The chlorohydrinated polymers were purified by separating the organic phase, washing it with 20%w aqueous sodium sulfate, and centrifuging it. The solution was then used as a primer as described in Example II.

EXAMPLE II

Chlorohydrinated Block Copolymers as Primers

The chlorohydrinated copolymers described in Example I were applied as coatings from 10%w solutions in toluene to untreated injection molded unit soles based on an S—B—S block copolymer. The primed soles were adhered by a heat activation process to leather uppers using commercial polyurethane adhesives (USM 322 and 312) for one group and a commercial neoprene adhesive (Compo 5134) for the other. The bond strengths thus formed are listed below:

| Primer Designation | Primer Composition, %w by Neutron Activation | | Average Bond Strength, Lb/Linear Inch Width with Two Adhesive Types | |
|---|---|---|---|---|
| | Cl | O | Polyurethane Adhesive[a] | Neoprene Adhesive[b] |
| A | 4.7 | 1.2 | 39 | — |
| B | 8.9 | 2.1 | 60 | 53 |
| C | 15.0 | 4.1 | 52 | — |
| D | 9.0 | 10.6 | 58 | 58 |

[a] USM 322 on sole, USM 312 on leather uppers (United Shoe Machinery)
[b] Compo 5134 (Comp Industries, Inc.)

The shoe soles were composed of S—B—S block copolymer, polystyrene, soft clay filler, processing oil, coloring pigments, and antioxidants.

EXAMPLE III

Modified Neoprene Adhesive

A commercial neoprene adhesive (Compo 5134) was modified by adding various amounts of a chlorohydrinated block copolymer together with lesser amounts of a coumarone-indene resin having a softening point of 10°C. The latter, present in amounts equal to about one-third of the amount of the chlorohydrinated block copolymer present, was added to control the activation temperature of the neoprene adhesive mixture. The chlorohydrinated block copolymer added to the neoprene adhesive was primer B in the above Examples I and II. The following table shows the peel strengths obtained in tests wherein the modified neoprene adhesive was utilized in the assembly of block copolymer unit-soling to leather uppers. (See U.S. Pat. No. 3,589,036). It will be noted from the table below that the neoprene cement which had not been modified with the chlorohydrinated block copolymer did not perform as an adhesive as well as the cement modified with the concentrations of the chlorohydrinated polymer which were exceptionally effective.

| Primer Designation | S-B-S Block Copolymer | Total Charge to Reactor, Parts/100 parts S-B-S | | | | Ca(OCl)₂ Addition Time, min. | Primer Solids Composition, %w by Neutron Activation | |
|---|---|---|---|---|---|---|---|---|
| | | Ca(CCl)₂ | Toluene | Acetone | Water | | Cl | O |
| A | I | 14 | 900 | 350 | 300 | 30 | 4.7 | 1.2 |
| B | I | 50 | 600 | 350 | 450 | 15 | 8.9 | 2.1 |
| C | I | 25 | 600 | 350 | 225 | 30 | 15.0 | 4.1 |
| D | II | 25 | 900 | 350 | 225 | 15 | 9.0 | 10.6 |

| Wt. % Chlorohydrinated Polymer in Adhesive | Average Peel Strength, pli, Soling/Adhesive/Leather |
|---|---|
| 0 | 0 |
| 3.2 | 31 |
| 7.6 | 49 |
| 14.0 | 52 |

What is claimed is:

1. A laminate comprising:
   a. a first substrate comprising a block copolymer having at least one polymer block of the group consisting of polymer blocks of conjugated dienes and hydrogenated polymer blocks of conjugated dienes, and at least two polymer blocks of a monoalkenyl arene;
   b. a second substrate of the group consisting of a textile, polyvinyl chloride and leather;

c. and as the bond therebetween, a composition comprising:
1. 4–25% by weight of a chlorinated and hydroxylated block copolymer; and
2. 75–96% by weight of a supplementary polymer of the group consisting of polyurethanes, polychloroprenes, polystyrenes, block copolymers having at least two monoalkenyl arene polymer blocks and at least one block of the group consisting of conjugated diene polymer blocks And hydrogenated polymer blocks of conjugated dienes. the chlorinated and hydroxylated block copolymers comprising at least two polymer blocks of at least one monoalkenyl arene and at least one chlorohydrinated polymer block of the group consisting of polymerized conjugated dienes, and hydrogenated polymer blocks of conjugated dienes, the chlorine and hydroxyl radicals being directly attached to carbon atoms of the polymeric chain, the weight ratio of chlorine atoms to hydroxyl groups being between about 0.5–5.0, the chlorine content being 1–15% by weight of the copolymer.

2. A laminate according to claim 1 wherein the first substrate is a block copolymer of a conjugated diene and a monoalkenyl arene.

3. A laminate according to claim 1 wherein the second substrate is a textile.

4. A laminate according to claim 1 wherein the supplementary polymer is a polyurethane polymer.

* * * * *